United States Patent [19]

Furukawa et al.

[11] Patent Number: 5,142,012
[45] Date of Patent: Aug. 25, 1992

[54] CURABLE RESIN AND PROCESS FOR PREPARING THE SAME

[75] Inventors: Hisao Furukawa, Kobe; Hideyuki Ohnari, Takasago; Yasushi Kato, Kobe, all of Japan

[73] Assignee: Kanegafuchi Kagaku Kogyo Kabushiki Kaisha, Osaka, Japan

[21] Appl. No.: 379,834

[22] Filed: Jul. 14, 1989

[30] Foreign Application Priority Data

Aug. 8, 1988 [JP] Japan .................. 63-197760

[51] Int. Cl.$^5$ .................. C08F 30/08; C08F 8/30
[52] U.S. Cl. .................. 526/279; 525/326.5; 525/342; 525/374; 525/450
[58] Field of Search .................. 526/279; 525/326.5, 525/342, 374, 450

[56] References Cited

U.S. PATENT DOCUMENTS

| | | | |
|---|---|---|---|
| 2,847,409 | 8/1958 | de Benneville et al. | 526/279 |
| 3,179,612 | 4/1965 | Plueddemann | 526/279 |
| 4,191,714 | 3/1980 | Yonezawa et al. | 525/102 |
| 4,429,082 | 1/1984 | Lee et al. | 525/428 |
| 4,430,486 | 2/1984 | Chang et al. | 525/44 |
| 4,714,738 | 12/1987 | Chang et al. | 525/58 |
| 4,721,747 | 1/1988 | Doshi | 524/261 |
| 4,789,710 | 12/1988 | Furukawa et al. | 525/440 |
| 4,801,658 | 1/1989 | Furukawa et al. | 526/279 |

FOREIGN PATENT DOCUMENTS 274112 7/1988 European Pat. Off. .

Primary Examiner—Paul R. Michl
Assistant Examiner—Peter Szekely
Attorney, Agent, or Firm—Armstrong, Nikaido, Marmelstein, Kubovcik & Murray

[57] ABSTRACT

A curable resin having a number average molecular weight of 1,000 to 100,000 and having the formula (I):

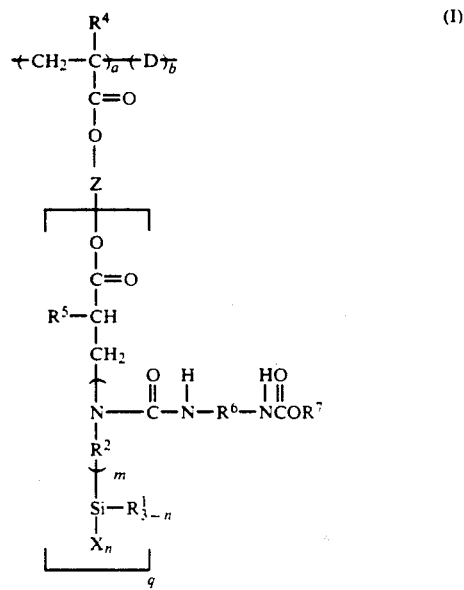

and a process for preparing the curable resin (I). The curable resin (I) of the invention is excellent in flexibility, solvent resistance, adhesion to organic materials as well as inorganic materials, storage stability, curability at ordinary temperature and weatherability.

12 Claims, No Drawings

5,142,012

CURABLE RESIN AND PROCESS FOR PREPARING THE SAME

BACKGROUND OF THE INVENTION

The present invention relates to a curable resin and its preparation process, and more particularly to a curable vinyl resin having hydrolyzable silyl groups at the molecular ends or side chains, which is excellent in, particularly, flexibility, solvent resistance and adhesion to organic materials and a process for preparing the same.

Japanese Unexamined Patent Publication No. 36395/1979 discloses that a hydrolyzable silyl group-containing vinyl resin has excellent curability at room temperature, adhesion to inorganic materials such as a concrete, a glass, a copper plate or aluminum and weatherability. However, the silyl group-containing vinyl resin is unsatisfactory in flexibility, solvent resistance and adhesion to organic materials. In order to improve the flexibility, solvent resistance or adhesion to organic materials, it can be considered to blend the vinyl resin with other resins. However, when blending other flexible resins with the vinyl resin for improving the flexibility of the vinyl resin, the vinyl resin with which the flexible resin is blended is poor in dryability though the flexibility can be improved. Also, when blending the vinyl resin with other solvent-resistant resins for improving the solvent resistance of the vinyl resin, the compatibility with other resins of the obtained resin mixture becomes poor.

In order to avoid the above-mentioned problems, in Japanese Unexamined Patent Publication No. 59615/1987, there is proposed a curable resin which is prepared by copolymerizing a vinyl monomer with a prepolymer, the prepolymer being prepared by Michael's addition reaction of an oligomer having in its molecule two or more acryloyloxy and/or methacryloyloxy groups with an aminosilane compound. According to the proposal, the obtained resin is excellent in flexibility since the oligomer wherein flexible segments exist is grafted onto the main chain of the vinyl resin, and is not poor in initial dryability or is not poor in compatibility with other resins, unlike the case of blending the vinyl resin with other resins.

However, since the resin has amino groups capable of promoting hydrolysis and condensation reaction of hydrolyzable silyl groups in the resin, the resin is poor in storage stability (the resin is increased in viscosity or colored during storage), and is poor in weatherability, e.g., the cured film thereof yellows.

An object of the present invention is to solve the above-mentioned defects and to provide a hydrolyzable silyl group-containing vinyl resin having excellent flexibility, solvent resistance, storage stability and adhesion to organic materials as well as the excellent curability at room temperature, adhesion to inorganic materials and weatherability.

A further object of the present invention is to provide a process for preparing such a vinyl resin.

These and other objects of the present invention will become apparent from the description hereinafter.

SUMMARY OF THE INVENTION

In accordance with the present invention, there is provided a curable resin having a number average molecular weight of 1,000 to 100,000 and having the formula (I):

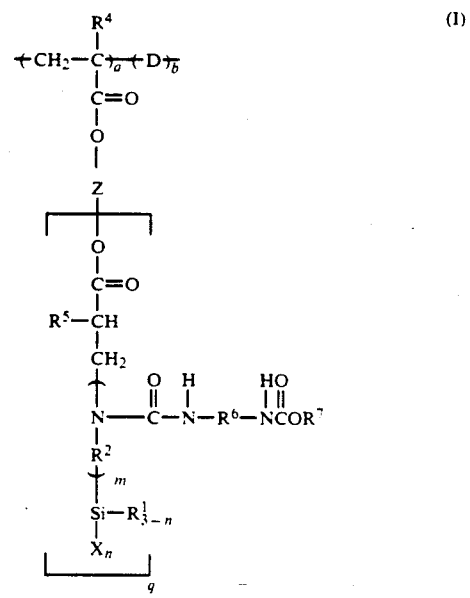

wherein Z is an organic group with a valence of two or more; q is an integer of 1 to 7; each $R^1$ is independently a group having 1 to 10 carbon atoms selected from an alkyl group, an aryl group and an aralkyl group; $R^2$ is a bivalent group having 1 to 10 carbon atoms selected from an alkylene group, an arylene group and an aralkylene group; $R^4$ and $R^5$ are the same or different and each is a hydrogen atom or an alkyl group having 1 to 10 carbon atoms; $R^6$ is a bivalent group having 1 to 30 carbon atoms selected from an alkylene group, a cycloalkylene group, an arylene group and an aralkylene group; $R^7$ is a monovalent organic group having no active hydrogen; each X is independently a hydrolyzable group selected from a halogen atom, an alkoxyl group, an acyloxy group, a ketoxymate group, an amino group, an acid amide group, an aminoxy group, a mercapto group and an alkenyloxy group; D is a vinyl monomer; n is an integer of 1 to 3; m is an integer of 1 to 10; a is an integer of 1 to 1,000; and b is an integer of 1 to 1,000.

Also, in accordance with the present invention, there is provided a process for preparing the curable resin having the formula (I).

DETAILED DESCRIPTION

The curable resin (I) of the present invention can be prepared by copolymerizing a prepolymer (G) having a number average molecular weight of 250 to 60,000 with a vinyl monomer (D) in a weight ratio of the vinyl monomer (D) to the prepolymer (G) of 100 : (0.1 to 10,000), the prepolymer (G) having the formula (IV):

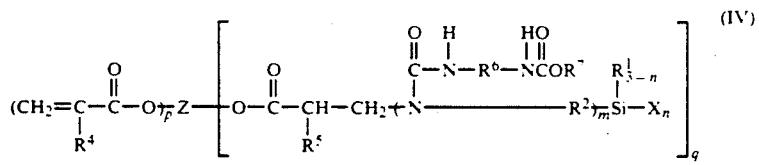

wherein Z is a residue of an oligomer (A) having β-alkyl-propenoyloxy groups, each X is a hydrolyzable group selected from a halogen atom, an alkoxyl group, an acyloxy group, a ketoxymate group, an amino group, an acid amide group, an aminoxy group, a mercapto group and an alkenyloxy group; $R^1$ is independently an alkyl, an aryl or an aralkyl group having 1 to 10 carbon atoms; $R^2$ is an alkylene, an arylene or an aralkylene group having 1 to 10 carbon atoms; $R^4$ and $R^5$ are the same or different and each is a hydrogen atom or an alkyl group having 1 to 10 carbon atoms; $R^6$ is an alkylene, a cycloalkylene, an arylene or an aralkylene group having 1 to 30 carbon atoms; $R^7$ is a monovalent organic group having no active hydrogen; n is an integer of 1 to 3; m is an integer of 1 to 10; and each p and q is an integer of 1 or more, satisfying that $2 \leq p+q \leq 8$. The prepolymer (G) having the formula (IV) can be prepared by conducting Michael's addition reaction of the β-alkylpropenoyloxy groups of an oligomer (A) having a number average molecular weight of 100 to 50,000 and having at least two β-alkylpropenoyloxy groups with an aminosilane compound (B) having the formula (II):

wherein X, $R^1$, $R^2$, m and n are as defined above, and conducting addition reaction of active hydrogens of the secondary amino groups of the obtained product with a monofunctional isocyanate compound (E) having the formula (III):

wherein $R^6$ and $R^7$ are as defined above.

The prepolymer (G) used in the present invention can be prepared by conducting Michael's addition reaction of the oligomer (A) having at least two β-alkylpropenoyloxy groups with the aminosilane compound (B), and conducting addition reaction of the obtained compound with the monofunctional isocyanate compound (E).

The oligomer (A) used in the invention is not particularly limited so long as the oligomer (A) is an organic polymer having at least two β-alkylpropenoyloxy groups in its molecule and having no free isocyanate group.

In the present invention, as the β-alkylpropenoyloxy group, acryloyloxy group and methacryloyloxy group are preferable.

Preferable examples of the oligomer (A) are, for instance,
(1) a polyfunctional acrylate or methacrylate,
(2) a polyester acrylate or methacrylate,
(3) a polyurethane acrylate or methacrylate,
(4) an organopolysiloxane acrylate or methacrylate,
(5) an epoxy acrylate or methacrylate,
(6) a polyether acrylate or methacrylate,
(7) a polyesterurethane acrylate or methacrylate, and the like.

In the present invention, there can be used, of course, not only the above-mentioned acrylates or methacrylates (1)–(7) but also 2-alkylpropenic acid esters having $C_2$–$C_{10}$ alkyl group or 2-alkylpropenic acid having $C_2$–$C_{10}$ alkyl group with a polyester, polyurethane, organopolysiloxane, epoxy resin, polyurethane or polyesturethane.

Examples of the polyfunctional acrylates or methacrylates (1) are, for instance, ethylene glycol acrylate or methacrylate, trimethylolpropane acrylate or methacrylate, and the like.

The polyester acrylate or methacrylate (2) is, for instance, prepared by condensing a polyfunctional alcohol such as ethylene glycol, propylene glycol, glycerol, trimethylolpropane, "F-99-199" (an alcohol modified-silicone oil commercially available from Nippon Unicar Kabushiki Kaisha) or "F-99-258" (an alcohol modified-silicone oil) with a polyfunctional carboxylic acid such as phthalic acid, adipic acid or trimellitic acid (benzene-1,2,4-tricarboxylic acid) and an acrylic acid and/or a methacrylic acid [hereinafter referred to as "(meth)acrylic acid]. Concrete examples thereof are, for instance, "Aronix M-6100" commercially available from Toagosei Chemical Industry Co., Ltd., "Aronix M-6200", "Aronix M-6400X", "Aronix M-6420X", "Aronix M-6800", "Aronix M-7100", "Aronix M-8030", "Aronix M-8100", and the like.

The polyurethane acrylate or methacrylate (3) is, for instance, prepared by conducting addition reaction of a hydroxyl group-containing (meth)acrylate such as hydroxyethyl (meth)acrylate, 2-hydroxypropyl (meth)acrylate, or hydroxybutyl (meth)acrylate, with a polyfunctional isocyanate such as 2,4-tolylene diisocyanate, diphenylmethane-4,4'-diisocyanate, xylylene diisocyanate, hexamethylene diisocyanate, isophorone diisocyanate (1,5,5-trimethylcyclohexen-3-on diisocyanate), lysine methyl ester diisocyanate, methylcyclohexyl diisocyanate, trimethylhexamethylene diisocyanate, n-pentane-1,4-diisocyanate,

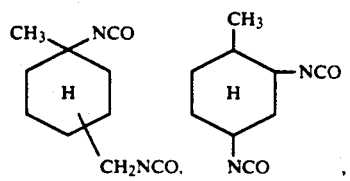

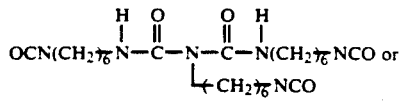

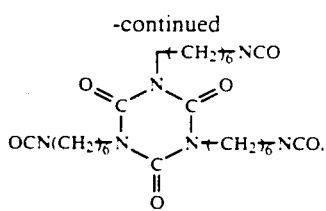

if necessary, using a polyfunctional alcohol such as ethylene glycol, trimethylolpropane, dimethylolpropionic acid, polyesterpolyol, polyetherpolyol, F-99-199 or F-99-258. Concrete examples thereof are, for instance, "Aronix M-1100", "Aronix M-1200", "Biscote 812" commercially available from Osaka Yuki Kagaku Kogyo Kabushiki Kaisha, "Biscote 823", and the like. The polyurethane acrylate or methacrylate (3) is also prepared by conducting addition reaction of an NCO group-containing (meth)acrylate such as β-isocyanatoethyl (meth)acrylate or (meth)acryloyl isocyanate with a hydroxyl group-containing (meth)acrylate such as hydroxyethyl (meth)acrylate, hydroxybutyl (meth)acrylate.

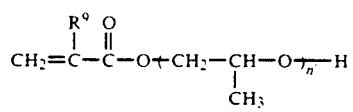

in which $R^9$ is a hydrogen atom or an alkyl group having 1 to 10 carbon atoms and n' is an integer of 1 to 100.

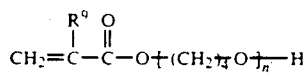

in which $R^9$ and n' are as defined above.

in which $R^9$ and n' are as defined above,

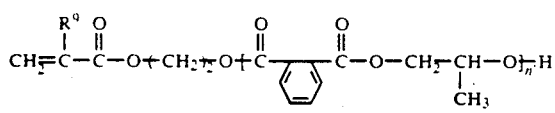

in which $R^9$ and n' are as defined above, or

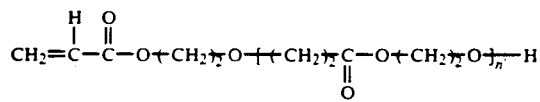

in which $R^9$ and n' are as defined above.

The organopolysiloxane acrylate or methacrylate (4) is prepared, for instance, by condensing a silanol modified-silicone oil such as "L-9000 (100)" commercially available from Nippon Unicar Kabushiki Kaisha, "L-9000 (1000)", "L-9000 (8000)" or "Y-7005" with a hydrolyzable silyl group-containing (meth)acrylate such as γ-(meth)acryloyloxypropyltrimethoxysilane.

The epoxy acrylate or metharylate (5) is prepared, for instance, by reacting an epoxy resin such as "Epicote 828" commercially available from Shell Kagaku Kabushiki Kaisha or "Epicoto 1001" with a (meth)acrylic acid or a hydroxyl group-containing (meth)acrylate. Concrete examples thereof are, for instance, "Biscote 540" commercially available from Osaka Yuki Kagaku Kogyo Kabushiki Kaisha.

The polyether acrylate or methacrylate (6) is prepared, for instance, by condensing a polyether such as polyethylene glycol, polypropylene glycol or tetramethylene glycol with a (meth)acrylic acid. Concrete examples thereof are, for instance, "14 EG-A" commercially available from KYOEISHA YUSHI Chemical Industry Co., Ltd.

The polyesterurethane acrylate or methacrylate (7) is prepared, for instance, by conducting addition reaction of hydroxyl group of a polycaprolactone (meth)acrylate with a polyfunctional isocyanate, if necessary, using a polyfunctional alcohol. The polycaprolactone (meth)acrylate is prepared by carrying out ring opening polymerization of ε-caprolactone in the presence of a hydroxyl group-containing (meth)acrylate such as 2-hydroxyethyl (meth)acrylate with a catalyst such as an organic titanate, tin chloride or perchloric acid catalyst. Concrete examples of the polycaprolactone (meth)acrylates are, for instance, "Placcel FM-1" [polycaprolactone containing methacryloyl group at the side end and which has a number average molecular weight (hereinafter referred to as "$\overline{Mn}$") of 244]commercially available from Daicel Chemical Industries, Ltd., "Placcel FM-4" (polycaprolactone containing methacryloyl group at the side end and which has an $\overline{Mn}$ of 600), "Placcel FM-8" (polycaprolactone containing methacryloyl group at the side end and which has an $\overline{Mn}$ of 1000), "Placcel FA-1" (polycaprolactone containing acryloyl group at the side end and which has an $\overline{Mn}$ of 230), "Placcel FA-4" (polycaprolactone containing acryloyl group at the side end, which has an $\overline{Mn}$ of 572), "Placcel FA-8" (polycaprolactone containing acryloyl group at the side end, which has an of 1000) or "Tone M-100" commercially available from Nippon Unicar Kabushiki Kaisha, and the like. Examples of the polyfunctional isocyanates are, for instance, 2,4-tolylene diisocyanate, diphenylmethane-4,4'-diisocyanate, xylylene diisocyanate, hexamethylene diisocianate, isophorone diisocyanate, lysine methyl ester diisocyanate, methylcyclohexyl diisocyanate, trimethylhexamethylene diisocyanate, n-pentane-1,4-diisocyanate,

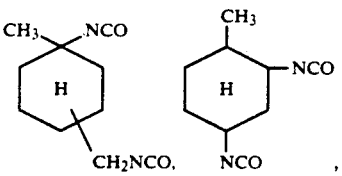

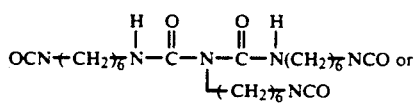

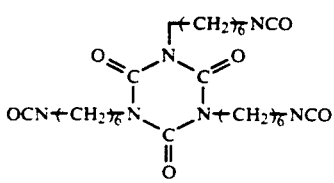

Examples of the polyfunctional alcohols are, for example, a polycaprolactone polyol such as "Placcel 205" (polycaprolactone containing hydroxyl groups at the both ends, which has an $\overline{M}n$ of 500) commercially available from Daicel chemical Industries, Ltd., "Placcel 208" (polycaprolactone containing hydroxyl groups at the both ends, which has an $\overline{M}n$ of 830), "Placcel 308" (polycaprolactone containing hydroxyl groups at the both ends, which has an $\overline{M}n$ of 860), "Placcel 212" (polycaprolactone containing hydroxyl groups at the both ends, which has an $\overline{M}n$ of 1250), "Placcel 212Al" (polycaprolactone containing hydroxyl groups at the both end, which has an $\overline{M}n$ of 1250), "Placcel 220" (polycaprolactone containing hydroxyl groups at the both end, which has an $\overline{M}n$ of 2000), "Placcel 220Al" (polycaprolactone containing hydroxyl groups at the both end, which has an of 2000), or a polyesterpolyol, an alcohol modified-silicone oil such as "F-99-199" or "F-99-258", dimethylolpropionic acid, and the like.

As the oligomer (A), there is preferable an oligomer having one methacryloyloxy group and at least one acryloyloxy group in its molecule. A number average molecular weight of the oligomer (A) is from 100 to 50,000, preferably from 200 to 20,000.

The aminosilane compound (B) used in the invention is a compound represented by the formula (II):

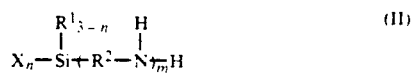

wherein X is a hydrolyzable group selected from a halogen atom, an alkoxyl group, an acyloxyl group, a ketoxymate group, an amino group, an acid amide group, an aminoxy group, a mercapto group and an alkenyloxy group; each $R^1$ is an alkyl, aryl or aralkyl group having 1 to 10 carbon atoms; $R^2$ is an alkylene, arylene or aralkylene group having 1 to 10 carbon atoms; n is an integer of 1 to 3 and m is an integer of 1 to 10. Examples of the aminosilane compound (B) are, for instance, γ-aminopropyltrimethoxysilane, γ-aminopropyltriethoxysilane, N-(β-aminoethyl)-γ-aminopropyltrimethoxysilane, N-(β-aminoethyl)-γ-aminopropyltriethoxysilane, H₂NCH₂CH₂NHCH₂CH₂NHCH₂CH₂CH₂Si(OMe)₃' H₂NCH₂CH₂NHCH₂CH₂NHCH₂CH₂CH₂Si(OEt)₃' γ-aminopropylmethyldimethoxysilane, N-β-(aminoethyl)γ-aminopropylmethyldimethoxysilane, and the like.

The monofunctional isocyanate compound (E) used in the invention is a compound represented by the formula (III):

wherein $R^6$ is an alkylene, a cycloalkylene, an arylene or an aralkylene group having 1 to 30 carbon atoms, and $R^7$ is a monovalent organic group having no active hydrogen. The monofunctional isocyanate compound (E) can be prepared by conducting addition reaction of a difunctional diisocyanate with a monofunctional alcohol. The addition reaction is conducted so as to be obtained an addition product of the diisocyanate and the monofunctional alcohol with equimolar amounts to each other (the addition product having a molar ratio of diisocyanate to monofunctional alcohol of 1:1).

Examples of the difunctional diisocyanates are, for instance, 2,4-toluilenediisocyanate, diphenylmethane-4,4'-diisocyanate, xylylene diisocyanate, hexamethylene diisocyanate, isophorone diisocyanate, lysine methyl ester diisocyanate, methylcyclohexyl diisocyanate, trimethylhexamethylene diisocyanate, n-pentane-1,4-diisocyanate.

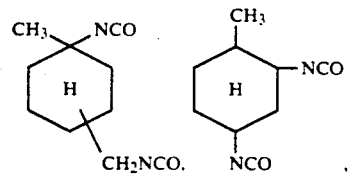

and the like.

Examples of the monofunctional alcohol are, for instance, an alkyl alcohol having 1 to 30 carbon atoms such as methanol, ethanol, n-butanol, hexanol, 2-ethyl hexanol or n-decanol, an aromatic alcohol having 7 to 30 carbon atoms such as benzyl alcohol, a cycloalkyl group-containing alcohol hving 6 to 30 carbon atoms such as cyclohexanol, an ethylene glycol monoether having 3 to 30 carbon atoms such as methyl cellosolve (ethylene glycol monomethyl ether), propylene glycol monoethyl ether, ethyl cellosolve (ethylene glycol monoethyl ether), or butyl cellosolve (ethylene glycol monobutyl ether), a ketone group-containing alcohol having 3 to 30 carbon atoms such as diacetone alcohol, an epoxide group-containing alcohol having 3 to 30 carbon atoms such as glycidol,

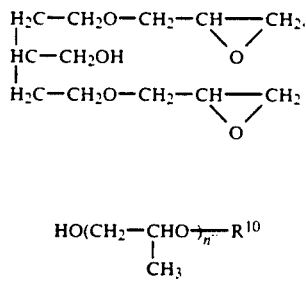

in which $R^{10}$ is an alkyl aryl or $CH_3$ aralkyl group having 1 to 10 carbon atoms and n" is an integer of 1 to 10,

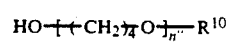

in which $R^{10}$ and n" are as defined above,

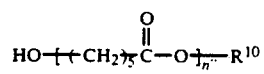

in which $R^{10}$ and n" are as defined above, and the like.

As the difunctional diisocyanate, there is preferable a difunctional diisocyanate wherein the reactivities of the two isocyanate groups are different from each other, such as isophorone diisocyanate, lysine methyl ester diisocyanate, n-pentane-1,4-diisocyanate.

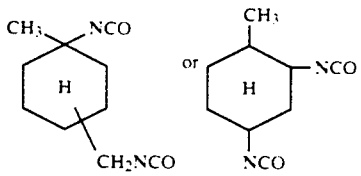

When reacting the monofunctional isocyanate (E) with the reaction product of the oligomer (A) and the aminosilane (B), the reaction mixture of the isocyanate (E) wherein the disfunctional diisocyanate remains may be used.

When Michael's addition reaction of the oligomer (A) containing β-alkylpropenoyloxy groups with the aminosilane compound (B) is carried out, the oligomer (A) and the aminosilane compound (B) are mixed and reacted at ordinary temperature to 200° C. in the substantial absence of water.

In the reaction, it is preferable that the oligomer (A) containing β-alkylpropenoyloxy groups is added to the aminosilane compound (B) from the viewpoint that the only primary amino groups are selectively reacted.

In the oligomer (A) having both acryloyloxy group and methacryloyloxy group in its molecule, since the acryloyloxy group is higher in reactivity than methacryloyloxy group, the aminosilane compound (B) can be introduced into the acryloyloxy group selectively, utilizing the difference in reactivity between acryloyloxy group and methacryloyloxy group of the silane coupling agent (aminosilane(B)) in Micheal's addition reaction.

Also, in order to inhibit radical polymerization reaction of β-alkylpropenoyloxy groups in the oligomer (A) during the reaction of the oligomer (A) and the aminosilane compound (B), it is preferable to add a polymerization inhibitor such as hydroquinone, benzoquinone, phenothiazine, monomethyl ether (MEHQ) or 2,6-di-t-butyl-4-methylphenol (BHT) to the reaction system prior to the reaction. MEHQ or BHT is preferable as the polymerization inhibitor from the viewpoint of colorlation.

The addition reaction of the oligomer (A) and the aminosilane compound (B) can proceed in the absence of a catalyst. There may be used a catalyst capable of promoting addition reaction, e.g., a tertialy amine such as dimethylbenzylamine or 2,4,6-tris(dimethylaminoethyl) phenol, a quaternary ammonium salt such as benzyltrimethylammonium hydroxide or benzyltrimethylammonium chloride, an alkali such as sodium methoxide, and the like.

A solvent may be employed or not in the reaction of the oligomer (A) and the aminosilane compound (B). When the reaction can easily proceed by using a solvent according to properties of components used in the reaction, the solvent may be used. Examples of the solvents are, for instance, toluene, xylene, butyl acetate, and the like.

In the reaction of the oligomer (A) and the aminosilane compound (B), it is necessary to previously exclude water from the reaction system. When the aromatic solvent such as toluene is employed, it is possible to previously exclude water from the reaction system by azeotropic distillation.

The reaction of the secondary amino group of the reaction products of the oligomer (A) and the aminosilane compound (B) with the monofunctional isocyanato compound (E) can easily exothermically proceed at from room temperature to 60° C.

In the preparation of the prepolymer (G), an amount of the primary amino group (—NH2) in the aminosilane compound (B) is from 0.1 to 0.99 mole, preferably from 0.25 to 0.9 mole per mole of the β-alkylpropenoyloxy group in the oligomer (A). When the amount of the amino group is less than 0.1 mole per mole of the β-alkylpropenoyloxy group, gelation easily occurs upon preparation of the curable resin of the invention. On the other hand, when the amount of the amino groups is more than 0.99 mole, no β-alkylpropenoyloxy group exists in the obtained product, that is, the desired prepolymer in the invention, in other words, the prepolymer (G) having the formula (IV) cannot be obtained.

An amount of the isocyanate compound (E) is from 0.5 to 1.0 mole, preferably 0.6 to 1.0 mole per mole of the amino group (—NH—) of the aminosilane compound (B). When the amount of the isocyanate compound (E) is more than 1.0 mole per mole of the amino group, free isocyanates are generated, which is not preferable. The lower limit of the isocyanate compound (E) is determined according to an amino value as defined below of the curable resin of the invention.

It is not preferable that amino groups remain in the obtained curable resin since the amino groups lower storage stability and weatherability of the curable resin.

The thus obtained prepolymer (G) is represented by the formula (IV):

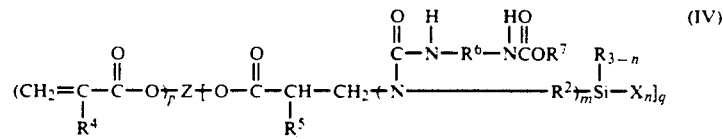

wherein Z, X, $R^1$, $R^2$, $R^4$, $R^5$, $R^6$, $R^7$, m, n, p and q are as defined above.

The thus obtained prepolymer (G) has a number average molecular weight of 250 to 60,000, preferably from 550 to 30,000. A molecular weight of the prepolymer (G) divided by the total number of the β-alkylpropenoyloxy and silyl groups in the prepolymer (G) [molecular weight of (G)/the total number of the β-alkylpropenoyloxy and silyl groups in (G)] is from 150 to 10,000, preferably from 250 to 5000.

In the preparation of the prepolymer (G), a mercaptosilane compound can be used together with the aminosilane compound (B). The mercaptosilane compound can be also subjected to Michael's addition reaction with the β-alkylpropenoyloxy groups in the same case as used the aminosilane compound (B) (silane coupling agents). Examples of the mercaptosilane compounds are, for instance, β-mercaptopropyltrimethoxysilane, β-meroaptopropyltriethoxysilane, β-mercaptopropylmethyldimethoxysilane, β-mercaptopropylmethyldiethoxysilane, and the like.

In addition to the aforementioned, the prepolymer (G) can be also prepared as follows:

That is, amino group of the aminosilane compound (B) is subjected to Michael's addition reaction with β-alkylpropenoyloxy group of the 2-alkylpropenic acid esters containing hydroxy group such as hydroxy group-containing (meth)acrylate as exemplified above, the monofunctional isocyanate compound (E) is subjected to addition reaction with active hydrogen of the secondary amino group of the obtained reaction product, and then the 2-alkylpropenic acid ester containing isocyanate group including an isocyanate group-containing (meth)acrylate such as β-isocyanatoethyl (meth)acrylate is reacted with an alcoholic hydroxyl group in the obtained product to give the prepolymer (G).

The curable resin (I) of the invention can be prepared by copolymerizing the thus obtained prepolymer (G) with a vinyl monomer (D). The prepolymer (G) is copolymerized with a vinyl monomer (D) in a graft-copolymerization according to macromonomer method, and the obtained copolymer may be partially crosslinked. The copolymer (I) of the invention may be prepared in any manner such as solution polymerization method, dispersion polymerization method or emulsion polymerization method.

The vinyl monomer (D) used in the present invention is not particularly limited. Examples of the vinyl monomer (D) are, for instance, an unsaturated carboxylic ester such as methyl acrylate, methyl methacrylate, ethyl acrylate, ethyl methacrylate, butyl acrylate, butyl methacrylate, isobutyl acrylate, isobutyl methacrylate, tert-butyl acrylate, tert-butyl methacrylate, lauryl acrylate, lauryl methacrylate, 2-ethylhexyl acrylate, 2-ethylhexyl methacrylate, stearyl acrylate, stearyl methacrylate, benzyl acrylate, benzyl methacrylate, cyclohexyl acrylate, cyclohexyl methacrylate, trifluoroethyl acrylate, trifluoroethyl methacrylate, pentafluoropropyl acrylate, pentafluoropropyl methacrylate, a diester or half ester of a polycarboxylic acid (for instance, maleic acid, fumaric acid, itaconic acid, and the like) with a linear or branched alcohol having 1 to 20 carbon atoms; an aromatic hydrocarbon vinyl compound such as styrene, α-methylstyrene, chlorostyrene, styrenesulfonic acid, 4-hydroxystyrene or vinyl toluene; a vinyl ester such as vinyl acetate or vinyl propionate; an allyl compound such as diallyl phthalate; a nitrile group-containing vinyl compound such as acrylonitrile or methacrylonitrile; an epoxy group-containing vinyl compound such as glycidyl acrylate or glycidyl methacrylate; an amino group-containing vinyl compound such as dimethylaminoethyl acrylate, dimethylaminoethyl methacrylate, diethylaminoethyl acrylate, diethylaminoethyl methacrylate, vinylpyridine, aminoethyl vinyl ether; an amide group-containing vinyl compound such as acrylamide, methacrylamide, itaconic diamide, α-ethylacrylamide, α-ethylmethacrylamide, crotone amide, malediamide, fumardiamide, N-vinyl pyrrolidone, N-butoxymethyl acrylamide, N-butoxymethyl methacrylamide N,N-dimethylacrylamide, N-methylacrylamide or acryloyl morpholine; a hydroxyl group-containing vinyl compound such as 2-hydroxyethyl acrylate, 2-hydroxyethyl methacrylate, 2-hydroxypropyl acrylate, 2-hydroxypropyl methacrylate, 2-hydroxyethyl vinyl ether, N-methylolacrylamide, N-methylolmethacrylamide, or "Aronix 5700" (commercially available from Toagosei Chemical Industry Co., Ltd.), "Placcel FA-1", "Placcel FA-4", "Placcel FM-1", "Praccel FM-8" [polyesters containing (meth)acryloyl group at the side end]; an unsaturated carboxylic acid such as acrylic acid, methacrylic acid, maleic acid, fumaric acid or itaconic acid or a salt (for instance, alkali metal salt, ammonium salt, amine salt, and the like) thereof; an unsaturated carboxylic anhydride such as maleic anhydride or a salt thereof; an other vinyl compound such as vinyl methyl ether, vinyl chloride, vinylidene chloride, chloroprene, propylene, butadiene, isoprene, maleimide, N-vinylimidazole or vinylsulfonic acid; a hydrolyzable silyl group-containing vinyl compound having the formula:

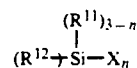

wherein $R^{11}$ is an alkyl, aryl or aralkyl group having 1 to 10 carbon atoms, $R^{12}$ is an organic residue having a polymerizable double bond and X and n are as defined above; and the like. Examples of the hydrolyzable silyl group-containing vinyl compounds are, for instance,

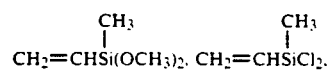

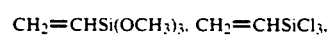

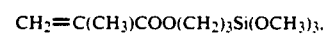

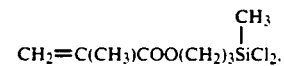

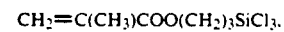

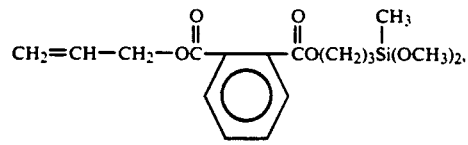

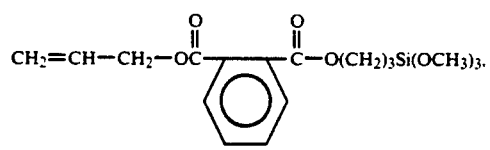

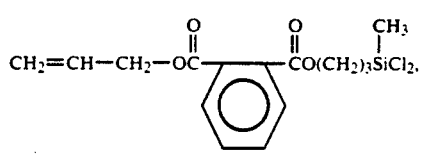

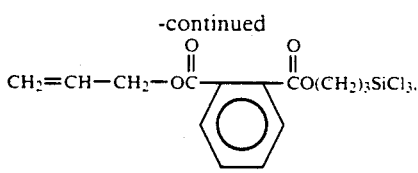

and the like.

When the vinyl group-containing silane compound (hydrolyzable silyl group-containing vinyl compounds) is used as the vinyl monomer (D), both the hydrolyzable silyl group in the prepolymers (G) and the hydrolyzable silyl group in the hydrolyzable silyl group-containing vinyl compound can provide crosslinking sites, and therefore the use of the silyl group-containing vinyl compound is effective for controlling properties of the film.

The amount of the prepolymer (G) is from 0.1 to 10,000 parts by weight, preferably 0.5 to 1,000 parts by weight, based on 100 parts by weight of the monomer (D). When the amount of the prepolymer is less than 0.1 part by weight per 100 parts by weight of the vinyl monomer (D), the properties of the obtained curable resin cannot be improved.

The amino value of the curable resin of the invention, measured according to the following formula, is not more than 5, preferably not more than 2. When the amino value is over 5, the storage stability and the weatherability of the curable resin are apt to lower, thus resulting in hindrance of practical use.

$$\text{Amino value} = \frac{A \times f \times 1/5 \times 56.108}{S}$$

wherein A (ml) is an amount of a 0.2N ethanol solution of hydrochloric acid consumed in titration, f is a titer of the 0.2N ethanol solution of hydrochloric acid and S is a weight (g) of the curable resin (solid matter) used in titration.

The vinyl monomer (D) is copolymerized with the prepolymer (G) in any manners, for instance, in the same manner as in Japanese Unexamined Patent Publication No. 36395/1979 and No. 36109/1982, and the like.

The solution polymerization using a radical polymerization initiator such as azobisisobutyronitrile is preferable. When a silyl group containing chain transfer agent such as γ-mercaptopropyltrimethoxysilane,

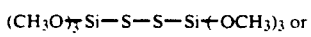

or

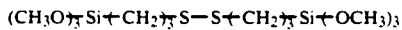

is used as a chain transfer agent, it is possible to introduce hydrolyzable silyl groups into the polymer ends of the curable resin of the invention.

In order to stabilize the curable resin (I) of the invention, there can be used hydrolyzable esters such as methyl orthoformate, ethyl orthoformate, methyl orthoacetate and ethyl orthoacetate, hydrolyzable silicon compounds such as ethyl silicate, methyl silicate, methyl trimethoxysilane or γ-methaoryloxypropyltrimethoxysilane, and partially hydrolyzed compounds thereof, and alcohols such as methanol, ethanol and isopropanol, and the like. These dehydrating agents or alcohols may be added not only during the copolymerization but also after completing the copolymerization.

The amount of the dehydrating or the alcohol is from 0 to 50 parts by weight, preferably from 0 to 20 parts by weight, based on 100 parts by weight of the curable resin (solid matter).

The obtained curable resin (I) of the invention has a number average molecular weight of 1,000 to 100,000, preferably from 2,000 to 50,000.

When the curable resin (I) of the invention is exposed to the atmosphere, fine network structure is gradually formed due to moisture in the atmosphere to cure. The curing catalyst may be employed or not upon curing the curable resin. Examples of the curing catalyst are, for instance, an alkyl titanate; an acid compound such as phosphoric acid, p-toluenesulfonic acid or an acid phosphoric ester; an amine such as ethylene diamine or tetraethylenepentamine; an organotin compound such as dibutyltin dilaurate or dibutyltin maleate; a basic compound such as sodium hydroxide or sodium methylate; and the like. The curable resin (I) of the invention is cured in the same manner as in Japanese Unexamined Patent Publication No. 105446/1982 or 124954/1984, and the like. The amount of the curing catalyst is from 0.005 to 10 parts by weight, preferably from 0.1 to 8 parts by weight, based on 100 parts by weight of the curable resin. The curable resin (I) of the invention is cured at room temperature, and the curable resin (I) can be cured by baking at a temperature of not higher than 200° C.

Usual additives such as fillers and pigments can be added to the curable resin (I). Also, a cellulosic resin such as nitrocellulose or cellulose acetate butyrate or a resin such as an epoxy resin, a polyvinyl chloride, a polyolefin or a polyester can be blended with the curable resin.

The curable resin (I) of the invention has the same excellent properties of the silyl group-containing vinyl resin with which the prepolymer (G) is not reacted, such as excellent curability at ordinary temperature, adhesion to inorganic materials and weatherability. In addition to the excellent properties, the curable resin is excellent in flexibility, solvent resistance and adhesion to organic materials, and internal stress caused by shrinkage on curing of the curable resin is rarely generated. The curable resin (I) is suitable for use as paints, coating agents, adhesives, sealants, potting agents, primers, and the like.

The present invention is more specifically described and explained by means of the following Examples in which all % and parts are by weight unless otherwise noted. It is to be understood that the present invention is not limited to the Examples, and various changes and modifications may by made in the invention without departing from the spirit and scope thereof.

REFERENCE EXAMPLE 1

[Preparation of an amino group-containing prepolymer]

A reactor equipped with a stirrer, a thermometer, a tube for introducing nitrogen, a dropping funnel and a condenser was charged with 96.7 g of isophorone diisocyanate (IPDI), 0.1 g of dibutyltin dilaurate and 99.9 g of toluene, to which 39.6 g of 2-hydroxyethyl methacrylate and 0.2 g of 2,6-di-t-butyl-4-methylphenol were added dropwise over 1 hour with stirring at 20° C. under nitrogen gas, and the reaction was continued at 30° C. for 1 hour. To the reaction mixture was added 361.8 g of Placcel FA-4, and the reaction was carried out at 95° C for 3 hours to give a polyesterurethane having acryloyloxy group and methacryloyloxy group at the both polymer ends.

In an infrared absorption spectrum of the obtained product, the absorption based on NCO (2260 cm$^{-1}$) disappeared and the absorption based on acryloyloxy and methacryloyloxy groups (from 1630 to 1640 cm$^{-1}$) was seen.

Then, a reactor equipped with a stirrer, a thermometer, a tube for introducing nitrogen, a dropping funnel and a condenser was charged with 118.9 g of γ-aminopropyltrimethoxysilane, to which 598 g of the obtained polyesterurethane having acryloyloxy and methacryloyloxy groups at the both ends was added at 20° C. with stirring under nitrogen gas over 1 hour, and the reaction was continued at 60° C. for 1 hour. To the reaction mixture was added 54.0 g of xylene to give an amino group-containing prepolymer (1) (solid concentration : 80 %).

In the infrared absorption spectrum of the obtained amino group-containing prepolymer (1), the absorption based on acryloyloxy group (980 cm$^{-1}$) disappeared and the absorption based on methacryloyloxy group (1640 cm$^{-1}$) was still seen.

REFERENCE EXAMPLE 2

Preparation of a prepolymer (G)

The amino group-containing prepolymer (1) was obtained in the same manner as in Reference Example 1.

The same reactor as used in Reference Example 1 was charged with 771 g of the amino group-containing prepolymer (1), to which 213.2 g of a methanol adduct with IPDI (NCO content: 12.3 %) was added at 20° C. with stirring under nitrogen gas over 1 hour. After the reaction was carried out at 80° C. for 30 minutes, 53.3 g of xylene to the reaction mixture to give a prepolymer (G-1) (solid concentration : 80%).

In the infrared absorption spectrum of the prepolymer (G-1), the absorption based on urea bond (1630 cm$^{-1}$) was seen.

REFERENCE EXAMPLE 3

Preparation of a monofunctional isocyanate compound (E)

A reactor equipped with a stirrer, a thermometer, a tube for introducing nitrogen, a dropping funnel and a condenser was charged with 551.2 g of IPDI and 0.6 g of dibutyltin dilaurate. To the mixture was added dropwise 248.8 g of dehydrated cyclohexanol with stirring under nitrogen gas at 20° C. over 1 hour. The reaction was carried out at 80° C. for 30 minutes and 199.4 g of toluene was added to the reaction mixture to give an adduct of IPDI and cyclohexanol with equimolar amounts to each other (solid concentration: 80%).

According to gel permeation chromatography (GPC) with respect to the obtained adduct, it was found that only the adduct of IPDI and cyclohexanol in a molar ratio of IPDI to cyclohexanol of 1:1 was produced, and that no IPDI remained and an adduct of IPDI and cyclohexanol in a molar ratio of IPDI to cyclohexanol of 1:2 was not produced.

REFERENCE EXAMPLE 4

Preparation of a prepolymer (G)

A reactor equipped with a stirrer, a thermometer, a tube for introducing nitrogen, and a condenser was charged with 91.9 g of β-isocyanatoethyl methacrylate, 376.2 g of Placcel FA-4, 0.1 g of dibutyltin dilaurate, 0.2 g of 2,6-di-t-butyl-4-methylphenol and 99.9 g of toluene, and the mixture was reacted with stirring under nitrogen gas at 95° C. for 3 hours to give a polyesterurethane having methacryloyloxy group at the one polymer end and acryloyloxy group at the other polymer end.

In the infrared absorption spectrum of the obtained product, the absorption based on NCO (2260 cm$^{-1}$) disappeared and the absorption based on (meth)acryloyloxy group (from 1630 to 1640 cm$^{-1}$) was seen.

Then, a reactor equipped with a stirrer, a thermometer, a tube for introducing nitrogen, a dropping funnel and a condenser was charged, with 123.3 g of γ-aminopropyltrimethoxysilane, to which 568 g of the obtained polyesterurethane was added at 20° C. with stirring under nitrogen gas over 1 hour, and the reaction was continued at 60° C. for 1 hour.

In the infrared absorption spectrum of the obtained product, the absorption based on acryloyloxy group (980 cm$^{-1}$) disappeared and the absorption based on methacryloyloxy group (1640 cm$^{-1}$) was seen.

To 691 g of the resultant was added 260.8 g of a 80% toluene solution of the equimolecular adduct of IPDI and cyclohexanol obtained in Reference Example 3 with stirring under nitrogen gas at 20° C. over 1 hour, the mixture was reacted at 80° C for 30 minutes, and 47.6 g of xylene was added thereto, to give a prepolymer (G-2) (solid concentration : 80%).

In the infrared absorption spectrum of the prepolymer (G-2), the absorption based on urea bond (1630 cm$^{-1}$) was seen.

EXAMPLE 1

Preparation of a curable resin copolymerized with the prepolymer (G-1)

A reactor equipped with a stirrer, a thermometer, a tube for introducing nitrogen, a dropping funnel and a condenser was charged with 100 g of butyl acetate and 10 g of methyl orthoacetate, and was heated to 110° C.

To the reactor was continuously added with stirring under nitrogen gas for 3 hours 250 g of the prepolymer (G-1) solution (solid concentration : 80%) obtained in Reference Example 2, 50 g of styrene, 143 g of methyl methacrylate, 25 g of stearyl methacrylate, 72 g of γ-methacryloyloxypropyltrimethoxysilane, 10 g of acrylamide, 15 g of :-meroaptopropyltrimethoxysilane and 10.4 g of azobisisobutyronitrile. Further, 1.2 g of azobisisobutyronitrile was added to the mixture, and the polymerization was continued for 2 hours. The resultant was diluted with butyl acetate to give a curable resin solution (solid concentration : 60%).

The obtained curable resin had a number average molecular weight ($\overline{Mn}$) according to GPC of 5,000 and an amino value (solid matter) of 0.1. The total amount of silane compounds introduced which provide crosslinking sites, (the total amount of γ-aminopropyltrimethoxysilane, γ-methacryloyloxypropyltrimethoxysilane and γ-mercaptopropyltrimelhoxysilane) was 0.1 mol per 100 g of the resin (solid matter).

Dibutyltin maleate was added to the curable resin solution in an amount of 2 parts per 100 parts of the resin (solid matter), and the mixture was diluted with butyl acetate to give a clear coating having a solid concentration of 40 %. The clear coating was coated by spraying on a mild steel plate polished with a No. #240 water-proof abrasive paper, and degreased. The coated steel plate was dried at 60° C. for 30 seconds and allowed to stand 23° C. to give a test piece. The obtained film had a thickness of 50 μm.

The pencil hardness, xylene-rubbing, Du pont impact strength and the internal stress as to the obtained film were examined, and the storage stability of the clear coating was examined by the following methods.

The results are shown in Table 1.

(1) Pencil hardness

The hardness of the film is measured by using a pencil hardness tester made by Toyo Seiki Kabushiki Kaisha in a load of 1 kg. The hardest hardness of the pencil which do not damage the film is shown in Table 1.

(2) Xylene-rubbing

After being allowed to stand at room temperature for 7 days, the test piece is rubbed ten times with an adsorbent cotton impregnated with xylene. The surface state of the film is observed with the naked eye.

| Estimation | ⊚: No change was observed. |
| | ○: Slight marring was observed. |
| | Δ: Marring was observed. |

(3) Du pont impact strength

Du Pont impact strength is measured, using a core with a diameter of ½ inches. The maximum weight and height causing no crack on the film are shown in Table 1.

(4) Internal stress

The clear coating as prepared above is coated on a degreased aluminum foil (13 mm × 180 mm × 0.1 mm), and the aluminum foil coated with the clear coating is allowed to stand at 23° C. for 60 days. The curvature of the aluminum foil is read by using a microscope. The internal stress is calculated according to a method proposed by Inoue et al in Kogyo Kagaku Zasshi, 108, 96 (1958), using the following equation:

$$p = \frac{E_2 h_2}{12\rho} \cdot \frac{2}{n(n-1)} \cdot \left[1 - \frac{1}{3}\left(\frac{h_2}{H}\right)^3\right]$$

wherein p is an internal stress, $E_2$ is a Young's modulus of the aluminum foil (725,000 kg/cm$^2$), $h_l$ is a thickness of the film: the actually measured value (cm), $h_2$ is a thickness of the aluminum foil (0.01 cm), $\rho$ is a radius curvature: the actually measured value (cm), H is (h1 + h2) and n is (h1/h2)

(5) Storage stability

A 100 ml sample bottle is charged with 50 ml of the curable resin solution (solid concentration: 60 %).

The bottle is allowed to stand in the open state at 23° C. under an atmosphere of 50 % R.H. The sampling of the resin in the bottole is conducted with passage of time and the sampled resin is dissolved in butyl acetate. The time (the number of days) expended until the gelation of the sampled resin is caused is shown in Table 1.

EXAMPLE 2

Preparation of a curable resin copolymerized with the prepolymer (G-2)

A reactor equipped with a stirrer, a thermometer, a tube for introducing nitrogen, a dropping funnel and a condenser was charged with 100 g of butyl acetate and 10 g of methyl orthoacetate, and was heated to 110° C.

To the reactor was continuously added with stirring under nitrogen gas for 3 hours the 250 g of the prepolymer (G-2) solution (solid concentration : 80%) obtained in Reference Example 4, 50 g of styrene, 146.2 g of methyl methacrylate, 25 g of stearyl methacrylate, 68.8 g of γ-methacryloyloxypropyltrimethoxysilane, 10 g of acrylamide, 15 g of γ-mercaptopropyltrimethoxysilane and 10.4 g of azobisisobutyronitrile. Further, 1.2 g of azobisisobutyronitrile was added to the mixture, and the polymerization was continued for 2 hours. The resultant was diluted with butyl acetate to give a curable resin solution (solid concentration : 60 %).

The obtained curable resin had an $\overline{Mn}$ according to GPC of 5,500 and an amine value (solid matter) of 0.2. A total amount of the silane compounds introduced which provide cross-linking sites, (the total amount of γ-aminopropyltrimethoxysilane, γ-methacryloxypropyltrimethoxysilane and γ-meroaptopropyltrimethoxysilane) was 0.1 mol per 100 g of the resin (solid matter).

A clear coating and a test piece were prepared from the resin in the same manner as in Example 1. As to the film, the pencil hardness, xylene rubbing, Du pont impact strength and internal stress, and as to the clear coating, the storage stability were measured in the same manner as in Example 1.

The results are shown in Table 1.

Comparative Example 1

Preparation of a curable resin copolymerized with the amino group-containing prepolymer A reactor equipped with a stirrer, a thermometer, a tube for introducing nitrogen, a dropping funnel and a condenser was charged with 100 g of butyl acetate and 10 g of methyl orthoacetate, and was heated to 110° C.

To the reactor was continuously added with stirring under nitrogen gas for 3 hours 250 g of the amino group-containing prepolymer solution (solid concentration : 80 %) obtained in Reference Example 1, 50 g of styrene, 156.8 g of methyl methacrylate, 25 g of stearyl methacrylate, 58.2 g of γ-methaoryloyloxypropyltrimethoxysilane, 10 g of acrylamide, 15 g of γ-mercaptopropyltrimethoxysilane and 10.4 g of azobisisobutyronitrile. Further, 1.2 g of azobisisobutyronitrile was added to the mixture, and the polymerization was continued for 2 hours. The resultant was diluted with butyl acetate to give a curable resin solution (solid concentration: 60%).

The obtained curable resin had an $\overline{Mn}$ according to GPC of 4,500 and an amino valve (solid matter) of to GPC of u500 and an amino value (solid matter) of 20. A total amount of silane compounds introduced, which provide cross-linking sites, (the total amount of γ-aminopropyltrimethoxysilane, γ-methacryloxypropyltrimethoxysilane and γ-mercaptopropyltrimethoxysilane) was 0.1 mol per 100 g of the resin (solid matter).

A clear coating and a test piece were prepared from the resin in the same manner as in Example 1. As to the film, the pencil hardness, xylene rubbing, Du pont impact strength and internal stress, and as to the clear coating, the storage stability were measured in the same manner as in Example 1.

The results are shown in Table 1.

COMPARATIVE EXAMPLE 2

Preparation of a curable resin having no prepolymer (G)

A reactor equipped with a stirrer, a thermometer, a tube for introducing nitrogen, a dropping funnel and a condenser was charged with 100 g of butyl acetate and 10 g of methyl orthoacetate, and was heated to 110° C.

To the reactor was continuously added with stirring under nitrogen gas for 3 hours a solution of 50 g of styrene, 203.4 g of methyl methacrylate, 100 g of butyl acrylate, 25 g of stearyl methacrylate, 111.6 g of γ-methacryloyloxypropyltrimethoxysilane, 10 g of acrylamide, 15 g of γmercaptopropyltrimethoxysilane and 10.4 g of azobisisobutyronitrile. Further, 1.2 g of azobisisobutyronitrile was added to the mixture, and the polymerization was continued for 2 hours. The resultant was diluted with butyl acetate to give a curable resin solution (solid concentration : 60%).

The obtained curable resin had an $\overline{Mn}$ according to GPC of 5,500 and an amino value (solid matter) of 0.01. A total amount of silane compounds introduced, which provide cross-linking points, (the total amount of γ-methacryloyloxypropyltrimethoxysilane and γ-mercaptopropyltrimethoxysilane) and γ-mercaptopropyltrimethoxysilane) was 0.1 mol per 100 g of the resin (solid matter).

A clear coating and a test piece were prepared form the resin in the same manner as in Example 1. As to the film, the pencil hardness, xylene rubbing, Du pont impact strength and internal stress, and as to the clear coating, the storage stability were measured in the same manner as in the Example 1.

The results are shown in Table 1.

TABLE 1

|  | Pencil hardness | Xylene rubbing | Du Pont impact strength | Internal stress | Storage stability |
|---|---|---|---|---|---|
| Substrate | Mild steal plate | Mild steal plate | Mild steal plate |  |  |
| Curing days | 7 days | 7 days | 7 days | 60 days |  |
| Ex. 1 | H | ◎ | 500 g · 50 cm | 0 kg/cm² | more than 14 days |
| Ex. 2 | H | ◎ | 500 g · 50 cm | 0 kg/cm² | more than 14 days |
| Com. Ex. 1 | H | ◯ | 500 g · 50 cm | 0 kg/cm² | less than 3 days |
| Com. Ex. 2 | H | Δ | 300 g · 20 cm | 40 kg/cm² | more than 14 days |

As shown above, as to the curable resin of the present invention, N,N,N'-substituted area bond with three substituents is produced by subjecting to addition reaction of active hydrogen of amino group, the active hydrogen of amino group making the storage stability or weatherability worse, with the monofunctional isocyanate compound. Thus, the curable resins hving no defects of known curable resins can be obtained.

Also, the curable resin of the present invention is excellent in flexibility, solvent resistance and adhesion to organic materials as well as original properties of the hydrolyzable silyl group-containing vinyl resin such as excellent curability at ordinary temperature, adhesion to inorganic materials and weatherability.

Further, the curable resin of the invention has small internal stress which occurs on curing the resin, forming siloxane bond by condensation reaction. Because the hydrolyzable silyl groups which are crosslinking sites are bonded to the vinyl main chain through flexible graft claims.

As mentioned above, according to the present invention, there can be provided the curable resin which is excellent in flexibility, solvent resistance, adhesion to organic materials as well as inorganic materials, weatherability, curability and storage stability.

In addition to the ingredients used in the Examples, other ingredients can be used in the Examples as set forth in the specification to obtain substantially the same results.

What we claim is:

1. A curable resin having a number average molecular weight of 1,000 to 100,000 and having the formula (I):

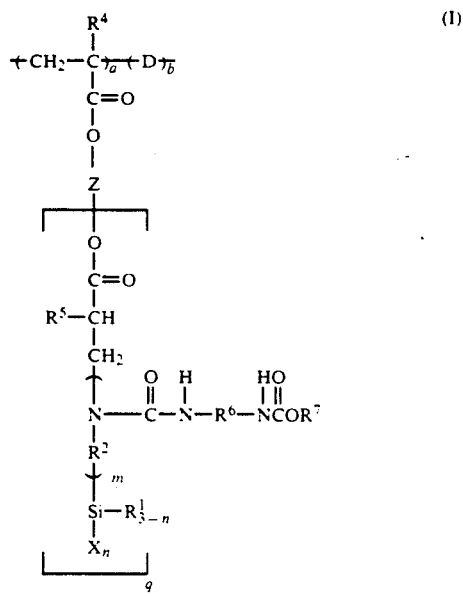

wherein Z is an organic group with a valence of two or more; q is an integer of 1 to 7; each $R^1$ is independently a group having 1 to 10 carbon atoms selected from an alkyl group, an aryl group and an aralkyl group; is a bivalent group having 1 to 10 carbon atoms selected from an alkylene group, an arylene group and an aralkylene group; $R^4$ and $R^5$ are the same or different and each is a hydrogen atom or an alkyl group having 1 to 10 carbon atoms; $R^6$ is a bivalent group having 1 to 30 carbon atoms selected from an alkylene group, a cycloalkylene group, an arylene group and an aralkylene group; $R^7$ is a monovalent organic group having no active hydrogen; each X is independently a hydrolyzable group selected from a halogen atom, an alkoxyl group, an acyloxy group, a ketoxymate group, an amino group, an acid amide group, an aminoxy group, a mercapto group and an alkenyloxy group; D is a vinyl monomer; n is an integer of 1 to 3; m is an integer of 1 to 10; a is an integer of 1 to 1,000; and b is an integer of 1 to 1,000.

2. The curable resin of claim 1, wherein said group $R^4$ is hydrogen or methyl group.

3. The curable resin of claim 1, wherein said group $R^5$ is hydrogen or methyl group.

4. The curable resin of claim 1, wherein said group Z is a polyalkylene ether.

5. The curable resin of claim 1, wherein said group Z is a polyester.

6. The curable resin of claim 1, wherein said group Z is a polyurethane.

7. The curable resin of claim 1, wherein said group Z is a organopolysiloxane.

8. A process for preparing a curable resin having a number average molecular weight of 1,000 to 100,000 and having the formula (I):

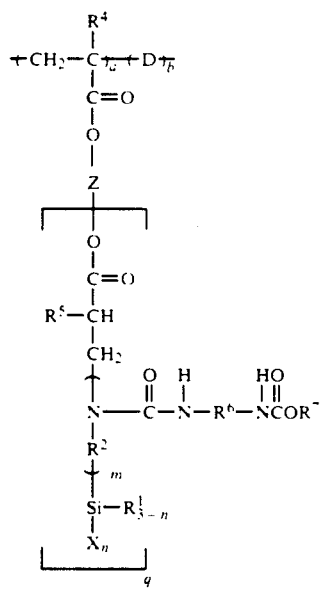

wherein Z is an organic group with a valence of two or more; q is an integer of 1 to 7; each $R^1$ is independently a group having 1 to 10 carbon atoms selected from an alkyl group, an aryl group and an aralkyl group; $R^2$ is a bivalent group having 1 to 10 carbon atoms selected from an alkylene group, an arylene group and an aralkylene group; $R^4$ and $R^5$ are the same or different and each is a hydrogen atom or an alkyl group having 1 to 10 carbon atoms; $R^6$ is a bivalent group having 1 to 30 carbon atoms selected from an alkylene group, a cycloalkylene group, an arylene group and an aralkylene group; $R^7$ is a monovalent organic group having no active hydrogen; each X is independently a hydrolyzable group selected from a halogen atom, an alkoxyl group, an acyloxy group, a ketoxymate group, an amino group, an acid amide group, an aminoxy group, a mercapto group and an alkenyloxy group; D is a vinyl monomer; n is an integer of 1 to 3; m is an integer of 1 to 10; a is an integer of 1 to 1,000; and b is an integer of 1 to 1,000; which comprises copolymerizing a prepolymer (G) having a number average molecular weight of 250 to 60,000 with a vinyl monomer (D) in a weight ratio of the vinyl monomer (D) to the prepolymer (G) of 100: (0.1 to 10,000), the prepolymer (G) having the formula (IV):

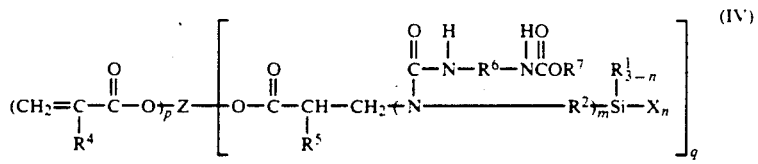

wherein Z is a residue of an oligomer (A) having at least two β-alkylpropenoyloxy groups, each p and q is an integer of 1 or more, satisfying that $2 \leq p+q \leq 8$, and X, $R^1$, $R^2$, $R^4$, $R^5$, $R^6$, $R^7$, m and n are as defined above, and the prepolymer (G) being prepared by conducting Michael's addition reaction of a β-alkylpropenoyloxy group of the oligomer (A) having a number average molecular weight of 100 to 50,000 and having at least two β-alkylpropenoyloxy groups with an aminosilane compound (B) having the formula (II):

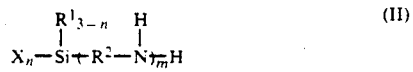

wherein X, $R^1$ and $R^2$ are as defined above, and conducting addition reaction of a monofunctional isocyanate compound (E) having the formula (III):

wherein $R^6$ and $R^7$ are as defined above with active hydrogen of the secondary amino group in the obtained reaction product of the oligomer (A) with the aminosilane compound (B).

9. The process of claim 8, wherein at least two β-alkylpropenoyloxy groups of said oligomer (A) are at least two group selected from the group consisting of acryloyloxy group and methacryloyloxy group.

10. The process of claim 8, wherein said prepolymer (G) is prepared by reacting the β-alkylpropenoyloxy group of said oligomer (A) with said aminosilane compound (B) in the substantial absence of water and reacting active hydrogen of the secondary amino group in the reaction product of said oligomer (A) and said aminosilane (B) with said monofunctional isocyanate compound (E) in the substantial absence of water.

11. The process of claim 10, wherein said β-alkylpropenoyloxy group is acryloyloxy or methacryloyloxy group.

12. The process of claim 8, wherein said oligomer (A) has both acryloyloxy group and methacryloyloxy group and said prepolymer (G) is prepared by conducting selectively Michael's addition reaction of acryloyloxy group with aminosilane compound (B) in the substantial absence of water, and then reacting active hydrogen of the secondary amino group of the reaction product of said oligomer (A) and said aminosilane (B) with said monofunctional isocyante compound (E) in the substantial absence of water.

* * * * *